United States Patent Office 3,690,925
Patented Sept. 12, 1972

3,690,925
METHOD OF BONDING POLYPROPYLENE OR A COPOLYMER OF ETHYLENE AND PROPYLENE TO AN ELASTOMER
Raymond J. T. Morris, Solihull, England, assignor to Dunlop Holdings Limited, London, England
No Drawing. Filed June 8, 1970, Ser. No. 44,615
Claims priority, application Great Britain, June 17, 1969, 30,552/69
Int. Cl. B32b 27/32
U.S. Cl. 117—76 T                     6 Claims

ABSTRACT OF THE DISCLOSURE

A method of modifying a polyalkene which comprises applying to the surface of the polyalkene a solution containing 0.025 to 10 percent by weight of a polyalkene which is the same or different from the polyalkene to be treated. Examples of suitable polyalkenes which may be modified include polypropylene and propylene/ethylene copolymers. Suitable solvents for forming the solution of the polyalkene include white spirits, paraffin, heavy coal tar naphtha, toluene and xylene. The modified surface of the polyalkene may be bonded to an elastomer such as natural rubber, styrene butadiene copolymer rubbers and acrylonitrile rubbers.

This invention relates to the treatment of thermoplastic materials to render them more amenable to bonding, and more particularly to the bonding of polyalkenes such as polypropylene and ethylene/propylene copolymers to elastomeric materials.

According to the present invention a method of modifying the surface of a polyalkene comprises applying to the surface of the polyalkene a solution containing 0.025 to 10 percent by weight of a polyalkene which is the same or different from the polyalkene to be treated.

Advantageously, the solution is at an elevated temperature which is below the melting point of the polyalkene to be treated. The temperature of the solution may, of course, be varied according to the choice of polyalkene to be treated and the solvent to be employed. A solution of polypropylene, for example, may be at a temperature of between 75° C. to 115° C., preferably 75° C. to 95° C. in white spirits.

The temperature of the solution should be such that it will not tend to "shrivel up" the thermoplastic material but must be high enough to prevent the thermoplastic material separating out of the solution.

The solution of the polyalkene may be made by dissolving the material in a suitable solvent at an elevated temperature and then allowing the solution to cool before treating the surface of the polyalkene. Polypropylene for example may suitably be dissolved at 125° C. and the solution used at 90° C.

While the same polyalkene may be used both to form the solution and to be treated by the solution, this is not essential. Thus, ethylene/propylene copolymer can be dissolved in a suitable solvent to form a solution and subsequently the solution used to treat polypropylene.

The invention is particularly useful in modifying the surface of crystallisable thermoplastic materials, i.e. materials which are capable of existing in the form of giving a regular X-ray diffraction pattern. Usually the material will be in such a crystalline form when treated with the solvent. Examples of polyalkenes to which the invention can usefully be applied include polypropylene, particularly isotactic polypropylene, and copolymers of ethylene and propylene.

The solvent employed will, in practice, vary to some extent with the polyalkene to be treated and its physical form. For isotactic polypropylene and ethylene/propylene copolymers it is preferred to use a hydrocarbon or hydrocarbon mixture which is liquid both at room temperature and under treatment conditions. Examples of suitable solvents are paraffin, heavy coal tar naphtha, toluene, white spirit, and xylene.

Since the treatment is intended to affect only the surface of the polyalkene the latter will usually be subjected to the action of the solution for a short period only, and protracted immersion has not been found to be advantageous. Normally the polyalkenes will not be immersed for more than 30 seconds, preferably not more than 1 second.

It has been found that polyalkenes wthen treated by the method of the present invention have good storage life when kept at ordinary temperatures; for example it has been found that a treated polypropylene fabric will give satisfactory adhesion after storage for more than a year.

The treated thermoplastic materials of the present invention may be bonded to substrates in a variety of ways.

One important example of these ways comprises coating the polyalkene with a latex or an aqueous dispersion of an elastomer.

EXAMPLE I

A sample of woven polypropylene scrim was immersed for 1 second in a 0.5 percent by weight solution of polypropylene in white spirit at 90° C. The solution had been prepared by dissolving polypropylene in white spirit at 140° V. The white spirit was dried off by placing the scrim in a circulating air oven at 70° C. The scrim was then coated with a natural latex compound having the following formulation which was then dried and cured:

|  | Parts (dry) |
|---|---|
| Natural rubber latex | 100 |
| Casein | 1 |
| Potassium oleate | 3 |
| Potassium hydroxide | 1 |
| Sulphur | 3 |
| Zinc diethyl dithiocarbamate | 1.5 |
| 2,2′ - methylene-bis(4 - ethyl - 6 - tertiary butyl phenol) [1] | 0.3 |
| Mercaptobenzthiazole | 0.5 |
| Calcium carbonate | 300 |
| Zinc oxide | 4 |
| Ammonium polyacrylate | 1 |
| Water to give 67% total solids. |  |

[1] Available commercially as Antioxidant 425.

On cooling, the backing compound was found to be adhered to the polypropylene and could not be removed as a film compared with a similarly prepared but untreated sample of scrim.

EXAMPLE II

In this example a foamed latex compound was applied to a polypropylene scrim which had been treated in the manner described in Example I. The latex compound had the following formulation:

|  | Parts (dry) |
|---|---|
| Styrene-butadiene copolymer latex [1] | 100 |
| Potassium oleate | 2.7 |
| Sodium salt of a disulphonic acid | 1.0 |
| 2,2′ - dihydroxy 3,3′-di(alpha methylcyclo-hexyl), 5,5′-dimethyl diphenylmethane [2] | 0.5 |
| Substituted phenol [3] | 0.5 |
| Calcium carbonate | 150.0 |
| Sulphur | 2.0 |

| | Parts (dry) |
|---|---|
| Zinc diethyl dithiocarbamate | 1.0 |
| Zinc mercaptobenzthiazole | 1.5 |
| N-cyclohexyl-2-benzthiazole sulphonamide | 0.5 |
| Cetyltrimethylammonium bromide | 0.5 |
| Zinc oxide | 3.0 |
| Ammonia | 3.5 |
| Ammonium acetate | 1.5 |
| Water to give 68% total solids. | |

[1] Available commercially as Intex 100.
[2] Available commercially as Nonox WSP.
[3] Available commercially as Nonox WSL.

The compound was prepared by adding to the latex with stirring, the other ingredients, 2,2'-dihydroxy 3,3'-di-(alpha methylcyclo-hexyl), 5,5'-dimethyl diphenyl- methane was added as a dispersion in water and the substituted phenol was prepared as an oil in water emulsion. The sulphur, zinc oxide and accelerators were all added in the form of dispersions in water. The cetyltrimethylammonium bromide was diluted with water to 25 percent concentration before addition. The latex was then frothed in a planetary mixer to a latex/air ratio of 1:7 and spread as a layer ¼ inch thick on the polypropylene scrim, dried and cured.

EXAMPLE III

In this example a non-vulcanizing polychloroprene latex compound having the following formulation was bonded to polypropylene treated in the manner described in Example I.

| | Parts (dry) |
|---|---|
| Polychloroprene latex [1] | 100 |
| Casein | 1 |
| Potassium oleate | 3 |
| Potassium hydroxide | 1 |
| Calcium carbonate | 300 |
| Ammonium polyacrylate | 1 |
| Water to give 64% total solids. | |

[1] Available commercially as Neoprene 400.

As in the previous examples the adhesion between the compound and the treated scrim was superior to that between untreated scrim and the compound.

EXAMPLE IV

In this example a polychloroprene adhesive containing polychloroprene and phenolic resins and based on a solvent system of toluene, ketones and esters, was applied to a polypropylene scrim treated by the method described in Example I.

The adhesive was allowed to dry and then the scrim adhered to a piece of plywood to which the same adhesive had been applied.

The adhesion between the wood and treated scrim was superior compared to that between an untreated polypropylene and plywood.

EXAMPLE V

In this example a vulcanizing polycisisoprene latex compound was adhered to a "spun bonded" polypropylene fabric treated as described below. The compound had the following formulation:

| | Parts (dry) |
|---|---|
| Polycisisoprene latex [1] | 100 |
| Potassium oleate | 5 |
| Calcium carbonate | 300 |
| Sulphur | 3 |
| Zinc diethyl dithiocarbamate | 1.5 |
| Mercaptobenzthiazole | 0.5 |
| Zinc oxide | 4 |
| Ammonium polyacrylate | 1 |
| Water to give 66% total solids. | |

[1] Available commercially as Cariflex IR 700.

A sample of spun bonded polypropylene fabric was immersed in a solution of the fabric in white spirits at 90° C. The solution had been prepared by dissolving a portion of the spun bonded polypropylene in white spirit at 140° C. The white spirit was dried off in a circulating air oven at 70° C. The fabric was then coated with the above polycisisoprene latex compound and then dried and cured. On cooling, the compound was found to be adhered to the polypropylene fabric and could not be removed as a film compared with a similarly but untreated sample of spun bonded fabric.

EXAMPLE VI

In this example a non-vulcanizing natural latex compound was applied to a polypropylene scrim treated in the manner described below. The rubber had the following formulation:

| | Parts (dry) |
|---|---|
| Natural rubber latex | 100 |
| Ethylene oxide/fatty alcohol condensate [1] | 1 |
| Substituted phenol [2] | 1 |
| Thiourea | 1 |
| Calcium carbonate | 300 |
| Sodium hexametaphosphate [3] | 0.2 |
| Ammonium polyacrylate | 1 |
| Water to give 69% total solids. | |

[1] Available commercially as Vulcastab LW.
[2] Available commercially as Nonox WSL.
[3] Available commercially as Calgon PT.

A sample of woven fibrillated polypropylene scrim was immersed for 1 second in a 1.0 percent by weight solution of polypropylene in xylene at 90° C. The solution had been prepared by dissolving polypropylene in xylene at 125° C. The xylene was dried off by placing in a circulating air oven at 70° C. The scrim was then coated with the above formulation and dried.

On cooling, the compound was found to be adhered to the polypropylene and could not be removed as a film compared with a similarly prepared but untreated sample of scrim.

EXAMPLE VII

In this example an acrylonitrile copolymer latex compound nitrile rubber was bonded to polypropylene scrim. The compound had the following formulation:

| | Parts (dry) |
|---|---|
| Acrylonitrile copolymer latex [1] | 100 |
| Powdered quartz | 300 |
| Ammonium polyacrylate | 1 |
| Water to give 61% total solids. | |

[1] Available as Breon 1574.

The scrim was prepared as in Example VI, The adhesion between the treated scrim and compound was superior compared to that obtained between the rubber and untreated scrim.

Having now described my invention, what I claim is:

1. A method of bonding polypropylene or a copolymer of ethylene and propylene to an elastomer which comprises applying to the surface of the polypropylene or said copolymer a solvent solution containing from about 0.025 to about 10 percent by weight of a crystallizable polypropylene or a copolymer of ethylene and propylene, removing the solvent from the solution to form a crystalline coating on said surface, coating the resulting surface with a dispersion of natural or synthetic rubber, and drying the coating.

2. The method of claim 1 wherein the polypropylene or said copolymer is immersed in the said solution for not more than 30 seconds.

3. The method of claim 2 wherein the polypropylene or said copolymer is immersed in the said solution for not more than one second.

4. The method of claim 1 wherein an isotactic polypropylene is bonded to the elastomer.

5. The method of claim 1 wherein a copolymer of ethylene and propylene is bonded to the elastomer.

6. The product of the method of claim 1.

(References on following page)

References Cited

UNITED STATES PATENTS

| | | | |
|---|---|---|---|
| 3,049,466 | 8/1962 | Erlich | 117—138.8 E X |
| 3,166,608 | 1/1965 | Natta et al. | 117—138.8 E X |
| 2,927,047 | 3/1960 | Schulde et al. | 117—138.8 E |
| 3,527,654 | 9/1970 | Jones et al. | 117—76 T X |
| 3,414,458 | 12/1968 | Lacy | 117—76 T X |
| 3,525,662 | 8/1970 | Padgett et al. | 117—76 T X |
| 2,971,858 | 2/1961 | Di Giulio et al. | 117—138.8 E X |
| 3,247,157 | 4/1966 | Reed et al. | 117—138.8 E X |
| 3,258,340 | 6/1966 | Riboni | 117—138.8 E X |
| 3,143,422 | 8/1964 | Caldwell | 117—76 F X |

RALPH HUSACK, Primary Examiner

U.S. Cl. X.R.

117—47 A, 72, 77, 80, 138.8 E; 156—333; 161—250